(12) United States Patent
Posselius et al.

(10) Patent No.: US 10,024,762 B2
(45) Date of Patent: Jul. 17, 2018

(54) SYSTEM AND METHOD FOR ACTIVE CONTROL OF WHEEL DYNAMICS

(71) Applicant: CNH Industrial America LLC, New Holland, PA (US)

(72) Inventors: John Posselius, Ephrata, PA (US); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 694 days.

(21) Appl. No.: 14/547,784

(22) Filed: Nov. 19, 2014

(65) Prior Publication Data

US 2016/0139003 A1    May 19, 2016

(51) Int. Cl.
| | |
|---|---|
| *G01M 17/013* | (2006.01) |
| *B60C 23/06* | (2006.01) |
| *B60C 23/00* | (2006.01) |
| *G05B 19/048* | (2006.01) |

(52) U.S. Cl.
CPC .......... *G01M 17/013* (2013.01); *B60C 23/002* (2013.01); *B60C 23/003* (2013.01); *B60C 23/066* (2013.01); *G05B 19/048* (2013.01)

(58) Field of Classification Search
CPC ............... G01M 17/013; G05B 19/048; G05B 2219/2614
USPC ....................................................... 700/276
See application file for complete search history.

(56) References Cited

U.S. PATENT DOCUMENTS

| | | | | |
|---|---|---|---|---|
| 2,067,490 | A | * | 1/1937 | Jones ...................... B60C 23/06 200/61.23 |
| 2,526,124 | A | * | 10/1950 | Dobson ............... B60C 23/0467 340/870.38 |
| 3,710,314 | A | * | 1/1973 | Bell ........................ B60C 23/04 200/61.25 |
| 4,898,216 | A | | 2/1990 | Schultz et al. |
| 4,989,148 | A | | 1/1991 | Gurke et al. |
| 5,180,458 | A | | 1/1993 | Schutz et al. |
| 5,207,173 | A | * | 5/1993 | Sadri ..................... B60C 23/063 116/34 B |
| 5,346,242 | A | | 9/1994 | Karnopp |
| 5,432,700 | A | | 7/1995 | Hrovat et al. |
| 5,447,332 | A | | 9/1995 | Heyring |
| 6,144,295 | A | | 11/2000 | Adams et al. |
| 6,212,424 | B1 | | 4/2001 | Robinson |

(Continued)

*Primary Examiner* — Ryan D. Coyer
(74) *Attorney, Agent, or Firm* — Rebecca L. Henkel; Rickard K. DeMille

(57) ABSTRACT

The present invention is a system for controlling the dynamic performance of wheels on an agricultural vehicle. A sensor is mounted on the agricultural vehicle that generates a signal corresponding to the deflection of the tire as the wheel is traveling along a surface. A controller receives the signal corresponding to the deflection of the tire and generates a control signal to an air regulator to either supply additional air to or remove air from the tire. An additional sensor may provide a signal corresponding to a variable load carried by the agricultural vehicle. An accelerometer may also be mounted on the agricultural vehicle and provide to the controller a signal corresponding to acceleration perpendicular to the surface. The controller is further configured to generate control the air regulator as a function of the varying load on the agricultural vehicle and/or based on the signal from the accelerometer.

13 Claims, 5 Drawing Sheets

(56) References Cited

U.S. PATENT DOCUMENTS

| | | |
|---|---|---|
| 6,292,095 B1 * | 9/2001 | Fuller ................. B60C 23/0408 340/442 |
| 6,305,373 B1 | 10/2001 | Wallace et al. |
| 6,305,673 B1 | 10/2001 | Delorenzis et al. |
| 6,868,719 B1 | 3/2005 | Claussen et al. |
| 7,161,476 B2 | 1/2007 | Hardman et al. |
| 7,302,837 B2 | 12/2007 | Wendte |
| 7,321,840 B2 | 1/2008 | Abramovitch |
| 7,891,673 B2 | 2/2011 | Delorenzis et al. |
| 2008/0066533 A1 * | 3/2008 | Beverly ................ B60C 23/002 73/146 |
| 2012/0221196 A1 | 8/2012 | Seymour et al. |
| 2014/0005956 A1 * | 1/2014 | Patel .................... B60C 23/064 702/41 |
| 2014/0316645 A1 * | 10/2014 | Norman Rose ......... G01L 1/146 701/34.4 |
| 2015/0032287 A1 * | 1/2015 | Duppong ............. B60C 23/067 701/1 |
| 2015/0375576 A1 * | 12/2015 | Holsapple ............ B60C 23/002 152/416 |

* cited by examiner

SYSTEM AND METHOD FOR ACTIVE CONTROL OF WHEEL DYNAMICS

BACKGROUND OF THE INVENTION

The subject matter disclosed herein relates generally to a system for actively controlling wheel dynamics on an agricultural vehicle, and in particular, to a system that monitors a changing load or a resonant operating point on the agricultural vehicle and varies the wheel pressure to maintain a desired operating performance of the vehicle.

Agricultural vehicles are used under a wide range of operating conditions. The vehicles are used outdoors and exposed, for example, to varying temperatures and ground conditions. The vehicle may be required to traverse a paved road to move from a storage facility to a field and then traverse gravel, grass, dirt, or mud getting to and working in the field. The vehicles may further be required to operate at varying speeds or under varying loads depending on the type of crops or the particular application being performed. For example, the vehicle may travel at different speeds when planting crops, applying fertilizer to a crop, or harvesting a crop. Further, as a vehicle applies product to a field, the load in the vehicle decreases as the product is dispensed, and as a vehicle harvests product from the field, the load in the vehicle receiving the crop increases.

It is desirable to provide a comfortable ride to the operator of the agricultural vehicle across the wide variety of operating conditions. Ride quality has been improved by providing improved suspensions on the agricultural vehicles. However, the dynamics of the wheels, such as spring and/or dampening, play a significant role in the ride quality as well. The dynamics of wheels are impacted by the physical construction of the wheel as well as the pressure in the wheel during operation. The suspension of the agricultural vehicle is typically tuned to provide a desired ride quality based on a certain dynamic of the wheel. Thus, it is desirable to maintain the dynamic of the wheel to provide the desired ride quality. However, the dynamic of the wheel is dependent on the loading of the agricultural vehicle. As the load changes, the wheel dynamics change, resulting in a divergence of the wheel dynamic from the desired wheel dynamics corresponding to the tuning of the suspension.

Therefore, there is a need for an improved system for controlling the dynamic performance of wheels during operation of an agricultural vehicle in which the load is changing.

Further, it is known that under certain loading conditions and speeds of operation or when travelling across a furrowed field agricultural vehicles may enter a resonant operating condition. At the resonant operating condition, the agricultural vehicle begins to severely bounce or pitch forward and backward. The undesirable operation is due, at least in part to the wheel dynamics.

Thus, it is also desirable to provide an improved system for controlling the dynamic performance of wheels to avoid operating an agricultural vehicle under a resonant operating condition.

SUMMARY OF THE INVENTION

The present invention is a system for controlling the dynamic performance of wheels on an agricultural vehicle. A sensor is mounted on the agricultural vehicle that generates a signal corresponding to the deflection of the tire as the wheel is traveling along a surface. A controller receives the signal corresponding to the deflection of the tire and generates a control signal to an air regulator to either supply additional air to or remove air from the tire. An additional sensor may provide a signal corresponding to a load on the agricultural vehicle. Because the load may vary due to applying material to or harvesting crops from a field, the signal corresponding to the load is monitored. The controller is further configured to generate the control signal to the air regulator as a function of the varying load on the agricultural vehicle. According to another aspect of the invention, an accelerometer may also be mounted on the agricultural vehicle. The controller may receive a signal corresponding to acceleration in an axis perpendicular to the surface along which the agricultural vehicle is traveling. If the controller detects a resonant operating point, the controller may further control the air regulator to supply air to or remove air from the tires on a periodic interval to reduce or eliminate the resonance.

According to one embodiment of the invention, a system for controlling performance of a plurality of wheels on an agricultural vehicle is disclosed, where each wheel includes a rim and a tire mounted to the rim. The system includes a deflection sensor, at least one air regulator, and a controller. The deflection sensor generates a feedback signal corresponding to a deflection of the tire on at least one of the wheels. The air regulator is configured to control air delivered to and removed from the wheels in response to a control signal. The controller is configured to receive the feedback signal from the deflection sensor and to generate the control signal for the air regulator as a function of the deflection detected by the deflection sensor.

According to another aspect of the invention, the deflection sensor may be either a contact or a non-contact sensor. A contact deflection sensor may be mounted to the rim, located within the tire of one of the wheels, and include an arm engaging an inner surface of the tire. A non-contact deflection sensor may be mounted within or external from the tire and include a transmitter and a receiver. The transmitter transmits a signal toward the tire and the receiver receives the signal reflected off the tire. The controller utilizes the reflected signal to determine the deflection of the tire.

The agricultural vehicle may further include multiple deflection sensors. Each deflection sensor may be operatively mounted to one of the wheels on the agricultural vehicle. The air regulator may be further configured to deliver air to and remove air from each of the wheels as a function of the feedback signal generated by the deflection sensor operatively mounted to that wheel. A position sensor generating a position feedback signal corresponding to an angular position of the wheel may be mounted on the agricultural vehicle, and the controller may be configured to read the feedback signal from the deflection sensor at one or more predefined angular positions.

According to still another aspect of the invention, the system may include an accelerometer mounted to the agricultural vehicle. The accelerometer is configured to generate an acceleration feedback signal in an axis generally perpendicular to a surface on which the agricultural vehicle is traveling, and the controller generates the control signal for the air regulator responsive to the acceleration feedback signal.

According to another embodiment of the invention, a system for controlling performance of a plurality of wheels on an agricultural vehicle configured to carry a load which varies during operation of the agricultural vehicle is disclosed, where each wheel includes a rim and a tire mounted to the rim. The system includes at least one pressure sensor, an operation sensor, at least one air regulator, and a controller. The pressure sensor generates a first feedback signal corresponding to a tire pressure in one of the wheels. The operation sensor generates a second feedback signal corresponding to an operating parameter of the agricultural vehicle. The rate at which the load varies is determined at least in part by the operating parameter sensed by the operation sensor. The air regulator is configured to control an delivered to and removed from the plurality or wheels responsive to a control signal, and the controller is configured to receive the first feedback signal and the second feedback signal and to generate the control signal for the air regulator as a function of the first and second feedback signals. The operating parameter measured by the operation sensor may be a speed of the agricultural vehicle, a rate at which the load is dispensed from the agricultural vehicle, a rate at which the load is received by the agricultural vehicle, or an amount of the load present on the agricultural vehicle. Optionally, the operation sensor may be a deflection sensor and the operating parameter measured is an amount of deflection of the tire on at least one of the plurality of wheels.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which ill be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
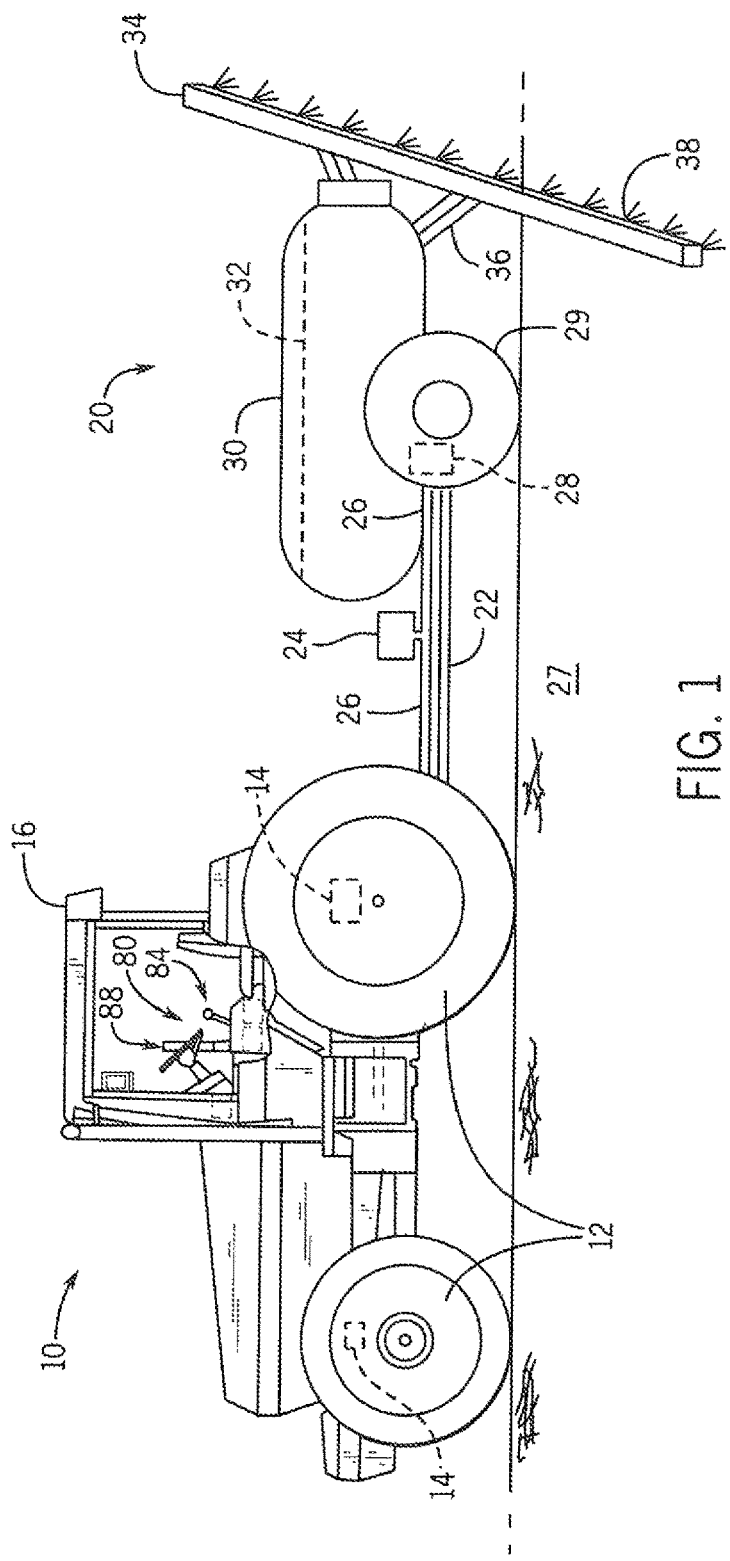
FIG. 1 is a side elevation view of a towing vehicle and a towed agricultural sprayer incorporating one embodiment of the present invention.
Figure 2:
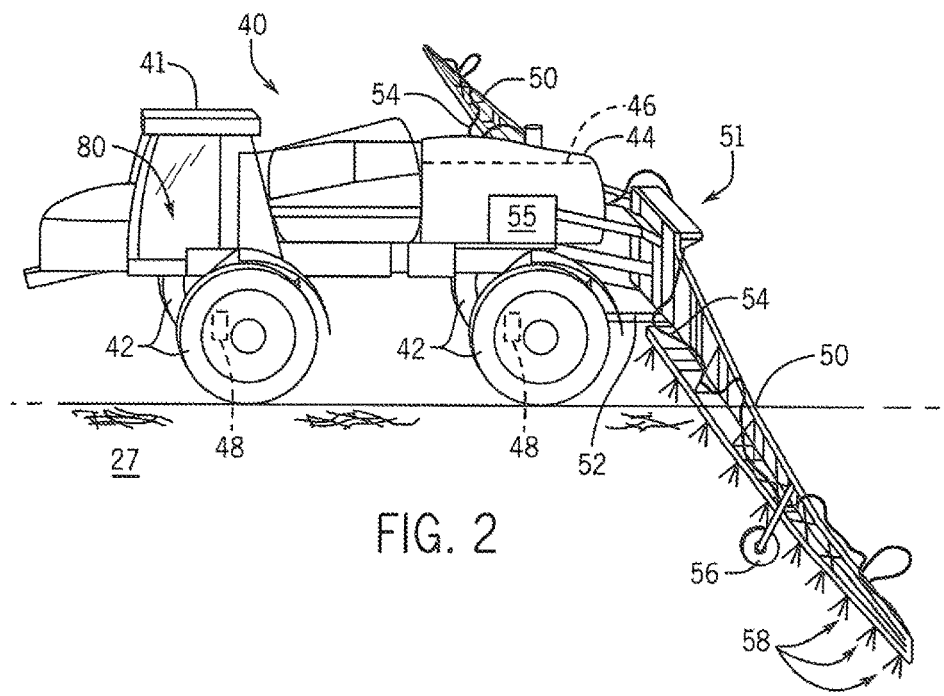
FIG. 2 is a side elevation view of a propelled sprayer implementing another embodiment of the present invention.

For purposes of this disclosure, field sprayers will be discussed as an exemplary type of agricultural vehicle; however, it is understood that the invention may be applied to various other types of agricultural vehicles without deviating from the scope of the invention. Field sprayers, as illustrated in FIG. 1, may be a towable sprayer 20 pulled behind a tractor or other towing vehicle 10 and include a fluid holding tank 30 supported by a frame and fluidly coupled to a series of spray nozzles 38 equidistantly spaced from one another along booms 34 extending outwardly from the frame. Optionally, as illustrated in FIG. 2, the field sprayer may be a self-propelled sprayer 40 which includes a fluid holding tank 44 and a pair of booms 50 mounted directly to the frame of the vehicle 40. Crop protection fluid, such as pesticides, or liquid fertilizer are dispensed through the spray nozzles onto the farm field and preferably in an even distribution spray patter so that the fluid is applied consistently across the farm field.

Referring now to FIG. 1, there is illustrated a field sprayer system which includes a towing vehicle 10, such as tractor, and a towable sprayer 20, where the towable sprayer 20 has at least one application device, such as nozzles 38, for applying crop inputs (fertilizer, herbicide, pesticides, and the like). The towing vehicle 10 includes a controller 80 including, for example, a joystick 84 and a display 88 to receive inputs from and provide information to the operator of the towing vehicle 10. The towing vehicle 10 may also include a wireless communication module 16 which includes, for example, an antenna for communication with global position system (GPS) satellites, cellular communications, wi-fi communications, or a combination thereof. The wireless communication module 16 is in communication with the controller 80 of the towing vehicle 10 and may be in communication with a similar module on the towable sprayer 20 or with another communication unit remotely located, for example, at an office or other facility. The towing vehicle 10 may also include one or more sensors 14 mounted to the wheels 12 of the towing vehicle 10. The sensors 14 may include, but are not limited to, a speed sensor, a pressure sensor, and a load sensor. Each sensor 14 is connected to the controller 80 via a wired or wireless connection to provide a signal corresponding to the e red operating parameter.

The towable sprayer 20 is connected to the towing vehicle 10 by a drawbar 22. The fluid holding tank 30 can hold a variety of crop inputs such as fertilizer, herbicide, pesticides, and the like, for dispensing onto the field 27 through nozzles 38, where the level of the crop input is denoted by dashed line 32. The nozzles 38 are shown positioned on a rearward nozzle support boom 34; however, the nozzles 38 can be installed in a forward nozzle support boom (not shown), and at periodic locations along the complete length of the boom 34. The towable sprayer 20 may also include one or more sensors 28 mounted to the wheels 29 of the sprayer 20. The sensors 28 may include, but are not limited to, a speed sensor, a pressure sensor, and a load sensor. The towable sprayer 20 may also include a tire inflation system 24 mounted on the sprayer 20. The tire inflation system 24 may include, for example, an air compressor, a holding tank, and a controller for supplying air to or removing air from the wheels 29 of the sprayer 20. It is further contemplated that the tire inflation system 24 may be in communication with the controller 80 on the towing vehicle 10. Optionally, a portion of or the entire tire inflation system 24 may be located on the towing vehicle 10 with appropriate mechanical, pneumatic, and/or electrical connections established between the tire inflation system 24 and the wheels 29. For ease of illustration, a generic connection 26 between the towing vehicle 10 and the sensors 28 and wheels 29 on the sprayer 20 is illustrated, it is contemplated that the connection 26 may include individual conductors or cables to establish electrical connections, pneumatic hoses or tubing to establish air connections and other connections that may be required between the towing vehicle 10 and the towable sprayer 20.

Referring next to FIG. 2, a self-propelled sprayer 40 is illustrated. The self-propelled sprayer 40 includes a controller 80 mounted in the cab 41 of the sprayer 40. The self-propelled sprayer 40 includes a fluid holding tank 44 that is supported by the frame of the sprayer 40. The fluid holding tank 44 can hold a variety of crop inputs such as fertilizer, herbicide, pesticides, and the like, for dispensing onto the field 27 through spray nozzle assemblies 58. A rear end 51 of the self-propelled sprayer 40 supports a pair of wing booms 50 to which a series of spray nozzle assemblies 58 are coupled. The wing booms 50 may be supported by smaller wheels 56 configured to engage the field 27 which the self-propelled sprayer 40 is traversing. Distribution lines 54 are flow coupled to the fluid tank 44 in a conventional manner, which allows fluid, e.g., fluidized fertilizer, pesticide, herbicide, etc., to be passed to each of the spray nozzle assemblies 58 for distribution to the field 27. The spray nozzle assemblies 58 are shown positioned on a rearward nozzle support boom 50 and at periodic locations along the complete length of the boom 50. The self-propelled sprayer 40 may also include one or more sensors 48 mounted to the wheels 42 of the sprayer 40. The sensors 48 may include, but are not limited to, a speed sensor, a pressure sensor, and a load sensor. The self-propelled sprayer 40 may also include a tire inflation system 55 mounted on the sprayer 40. The tire inflation system 55 may include, for example, an air compressor, a holding tank, and a controller for supplying air to or removing air from the wheels 42 of the sprayer 40. It is further contemplated that the tire inflation system 55 may be in communication with the controller 80 on the sprayer 40. The tire inflation system 55 further includes appropriate mechanical, pneumatic, and/or electrical connections established between the tire inflation system 55 and the wheels 42. Operation of the tire inflation system 55 will be discussed in more detail below.

Figure 3:
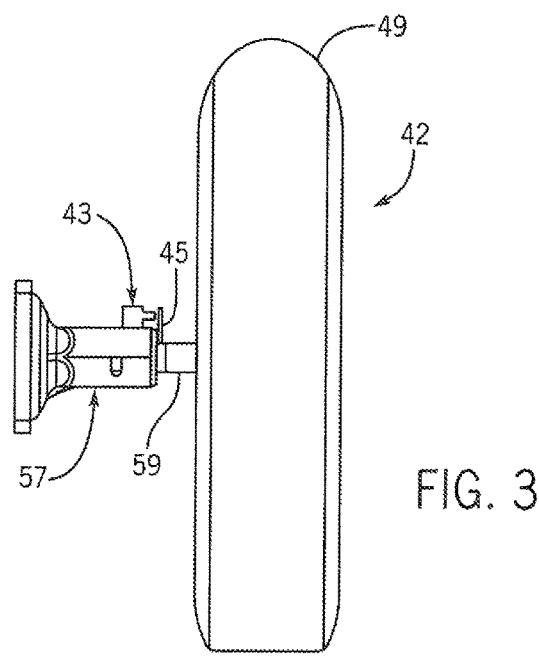
FIG. 3 is a partial front elevation view of an axle and wheel illustrating a position sensor utilized in one embodiment of the present invention.
Figure 4:
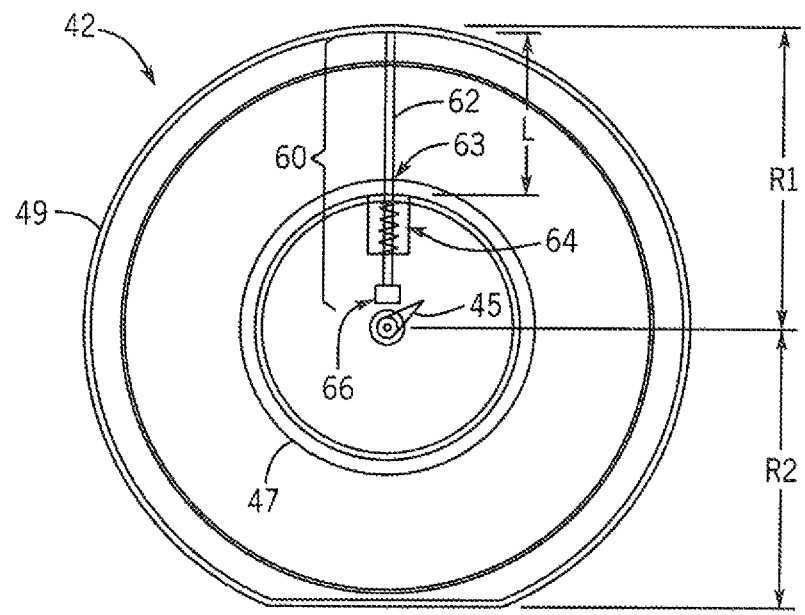
FIG. 4 is side elevation view of the wheel of FIG. 3 illustrating one embodiment of a tire deflection sensor in an extended position.
Figure 5:
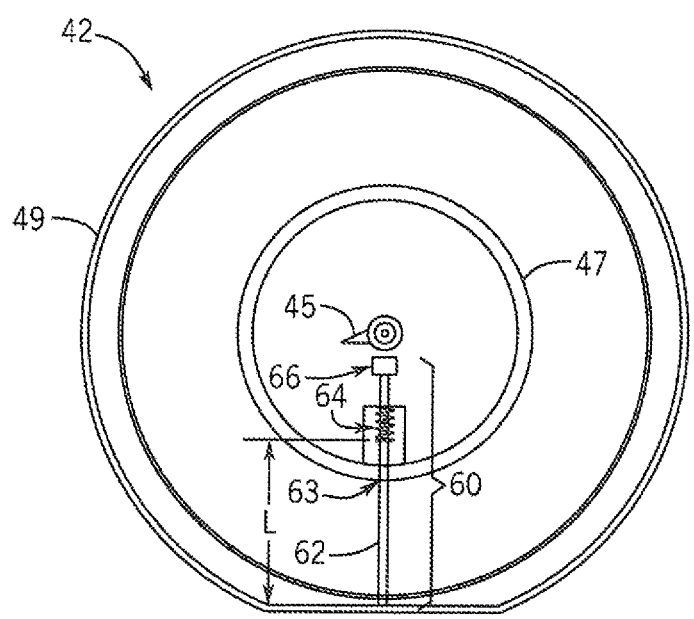
FIG. 5 is side elevation view of the wheel of FIG. 3 illustrating the tire deflection sensor of FIG. 4 in a compressed position.

Referring next to FIGS. 3-5, one embodiment of a mechanical system for detecting tire deflection is disclosed. In FIG. 3, a position sensor is illustrated, which includes a magnetic sensor 43 mounted to a stationary portion of the frame 57 and a ferrous tab 45 mounted to a rotating portion of the axle 59. As the ferrous tab 45 passes the magnetic sensor 43, a signal is generated once per revolution to indicate the angular position of the wheel 42. It is contemplated that various other types of position sensors, including but not limited to encoders or resolvers may be utilized to generate a signal corresponding to the angular position of the wheel 42.

In FIGS. 4 and 5, a contact-type deflection sensor 60 is illustrated in extended (FIG. 4) and compressed (FIG. 5) positions. The contact-type deflection sensor 60 includes an arm 62, having a length (L), configured to engage the inner surface of the tire 49, a compression spring 64 configured to bias the arm 62 outward toward the inner surface of the tire 49, and a transducer 66, such as a potentiometer, configured to generate a signal corresponding, for example, to a change in the position of the arm 62 along a compression axis or to the compression of the spring 64. The signal may be transmitted to the controller 80 either via a wired or wireless connection. According to the illustrated embodiment, the contact-type deflection sensor is mounted within the wheel 42. The compression spring 64 and transducer 66 are mounted to the rim 47 and the arm 62 extends through an opening 63 in the rim into the tire 49. The opening 63 may include, for example, a gasket or other sealing means to retain the air pressure in the tire 49. The compression spring 64 biases the arm 62 outward such that when the arm 62 extends away from the ground a first radius, R1, of the wheel 42 is measured. As the wheel 42 rotates the outer surface the tire 49, at the location the arm 62 is engaging, contacts the ground. The arm 62 is forced inward, compressing the spring 64 for a short duration until the arm 62 is generally perpendicular to the ground, as shown in FIG. 5. As the wheel 42 continues to rotate, the spring 64 biases the arm 62 outward causing the arm 62 to extend until the outer surface of the tire 49 no longer engages the ground and the arm 62 is again in an extended position. When the arm 62 is generally perpendicular to the ground, a second radius, R2, of the wheel 42 is measured. The difference between the first radius, R1, and the second radius, R2, defines the deflection of the tire 49. The ferrous tab 45 and the magnetic sensor 43 of the position sensor are preferably located on the frame 57 and axle 59 such that the position sensor generates a signal in tandem with the arm 62 reaching its compressed position in order for the controller 80 to read the signal from the transducer 66 and obtain a measurement of the second radius, R2.

Figure 6:
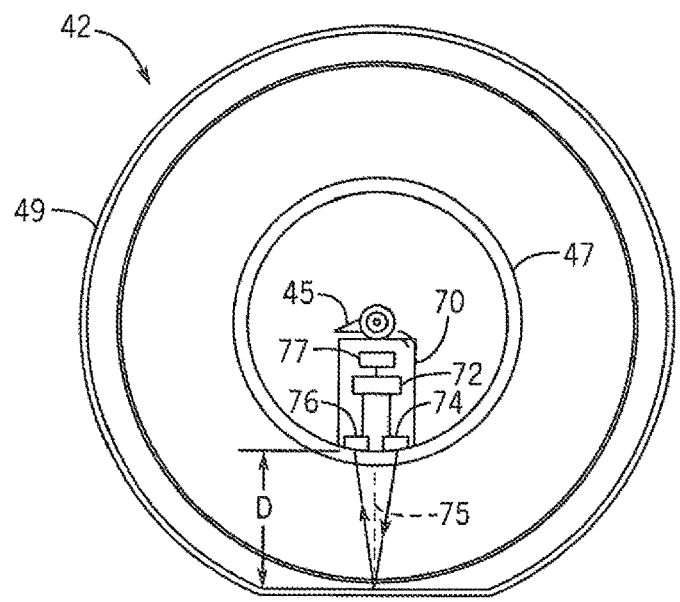
FIG. 6 is side elevation view of the wheel of FIG. 3 illustrating another embodiment of a tire deflection sensor.

In FIG. 6, a non-contact-type deflection sensor 70 is illustrated. The non-contact-type deflection sensor 70 includes a controller 72 in communication with a transmitter 74 and a receiver 76. The controller 72 may include discrete logic devices, a processor and memory, or a combination thereof. The controller 72 enables the transmitter 74 to emit a signal toward an inner surface of the tire 49 along a transmission axis 75. The signal may be any suitable signal generated, for example, via optical or infrared light emitting diodes (LEDs). Optionally, the signal may be a radio frequency (RF) or ultrasound signal. At least a portion of the signal is reflected from the inner surface of the tire 49 along the transmission axis 75 and received by the receiver 76. As illustrated, the non-contact deflection sensor 70 further includes a wireless communication interface 77 for communication to the controller 80 of the agricultural vehicle. According to one embodiment of the invention, the non-contact-type deflection sensor 70 receives a transmit command from the vehicle controller 80 to generate the emitted signal. The deflection sensor 70 generates a receive signal corresponding to reception of the emitted signal at the receiver 76 and transmits the receive signal back to the vehicle controller 80. The vehicle controller 80 then determines the distance, D, travelled by the signal. According to another embodiment of the invention, the deflection sensor 70 may be configured to control transmission of the emitted signal and to determine the distance, D, travelled by the signal. The deflection sensor 70 may be further configured to transmit the distance, D, to the vehicle controller 80.

Figure 7:
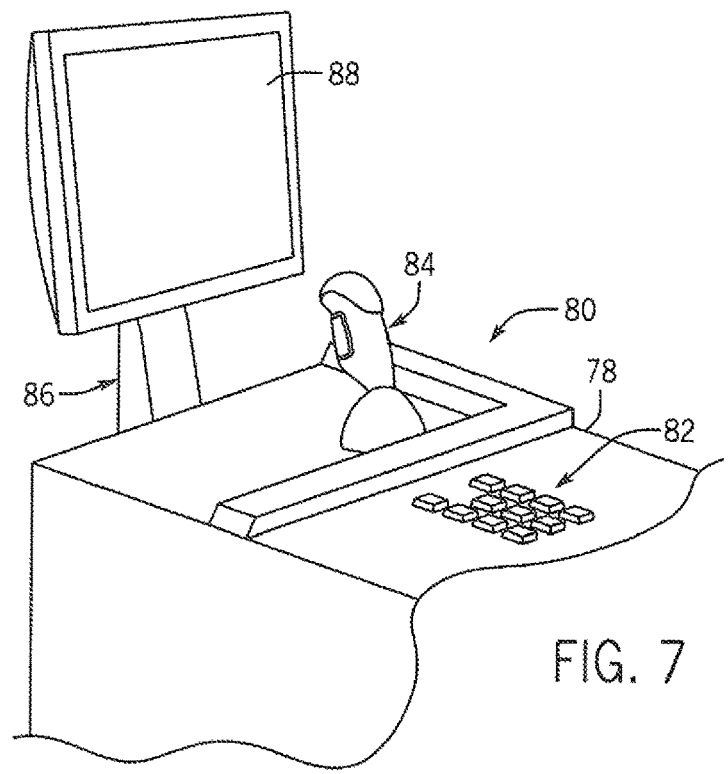
FIG. 7 is an exemplary environmental view of a controller configured to control wheel dynamics according to one embodiment of the invention.

Referring next to FIG. 7, the arm rest 78 of an exemplary agricultural vehicle including a controller 80 incorporating the present invention is illustrated. The arm rest 78 includes various devices to receive input from the operator to control the tractor such as a panel of buttons 82 or a joystick 84. A mounting arm 86 is connected to the arm rest 78 and configured to hold the controller 80. Optionally, the controller 80 may be mounted to any suitable location within the tractor.

Figure 8:
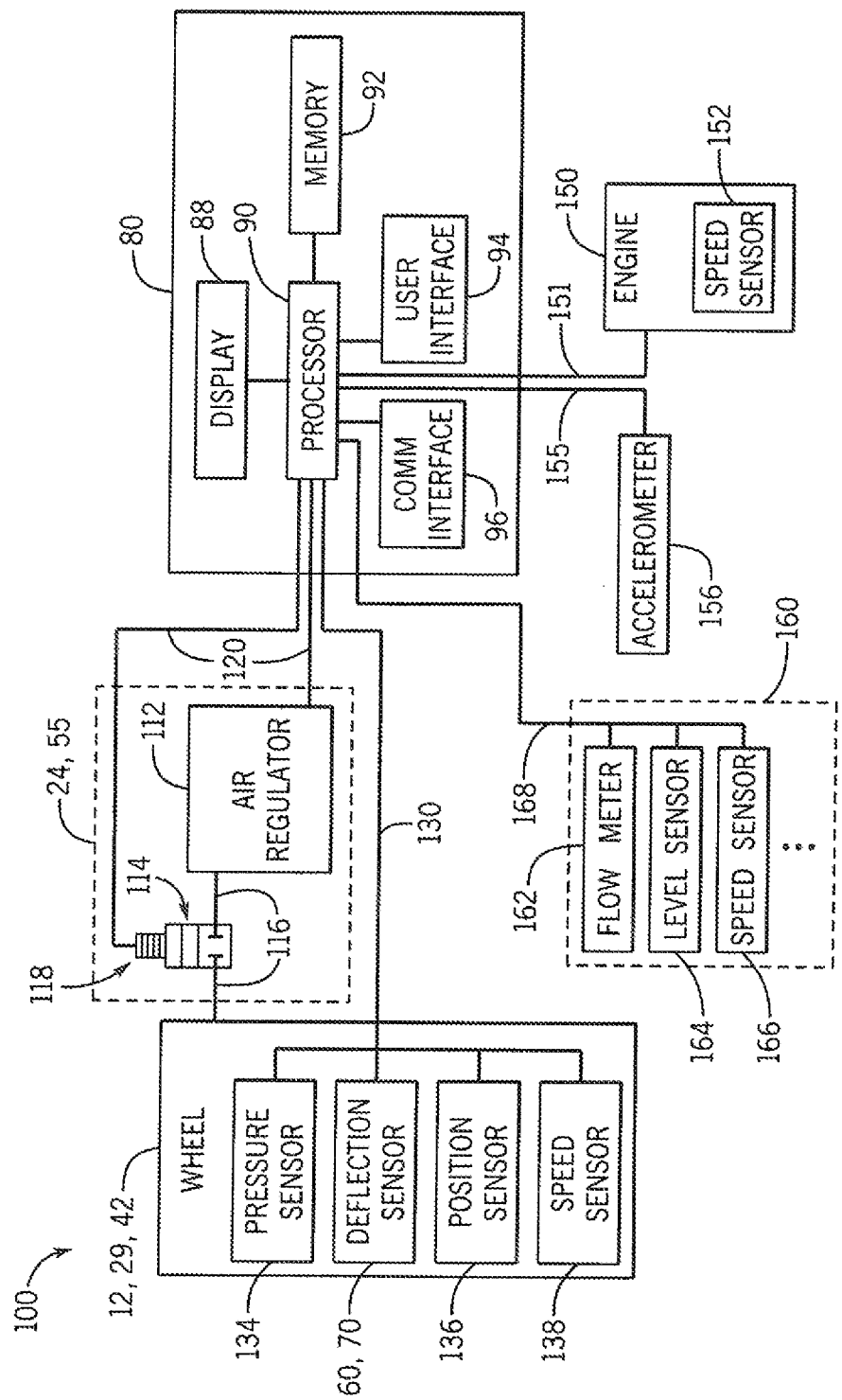
FIG. 8 is a block diagram representation of the controller of FIG. 7 according to one embodiment of the present invention.

Referring also to FIG. 8, the controller 80 includes a processor 90 in communication with a memory device 92. It is contemplated that the processor 90 may be a single device or multiple devices operating in parallel or independently without deviating from the scope of the invention. Further, the processor 90 may a microprocessor, a field programmable gate array (FPGA), application specific integrated circuit (ASIC), discrete logic devices, or any combination thereof. It is further contemplated that the memory device 92 may be a single device or multiple devices, persistent or non-persistent memory, or any combination thereof. A series of instructions, or a program, may be stored in the memory device 92 and executed by the processor 90 to perform various functions of the controller 80 described herein. The controller 80 may include various combinations of ports, defining a communication interface 96, with which the processor 90 is also in communication according to application requirements. The communication interface 96 may include, but is not limited to a network interface card (NIC), a Bayonet Neill-Concelman (BNC) connector for coaxial cable, a Universal Serial Bus (USB) port, a wireless communication (WiFi) port, a global positioning system (GPS) antenna, and an input/output (I/O) port. The various ports provide interfaces between the processor 90 and local and/or remote resources including, but not limited to, the operator, attached agricultural implements, interface devices, radio and/or satellite communication devices. The processor 90 is further in communication with the display 88 to provide a visual indication of operating status and configuration to the operator. The display 88 may also be a touch screen device configured to receive input from the operator. The controller 80 receives input from an operator via a user interface 94. The user interface 94 may include one or multiple devices by which the operator provides input to the controller 80, including, but not limited to, the panel of buttons 82 or joystick 84 illustrated in FIG. 7.

FIG. 8 further illustrates one embodiment of a control system 100 used to actively control the wheel dynamics during operation of the agricultural vehicle. The control system 100 includes the vehicle controller 80 as described above. If the agricultural vehicle is a self-propelled vehicle, such as the sprayer 40 discussed above, a single controller 80 may be provided to control all operations of the vehicle. If the agricultural vehicle is a combination of a towing vehicle 10 and a towed vehicle, such as the towed sprayer 20 discussed above, the towing vehicle 10 may include a first controller 80 and the towed vehicle may include a second controller and the control system 100 may be implemented on either the first controller 80, the second controller, or a combination thereof. According to yet another option, the towed vehicle may be the only vehicle on which the tire dynamics are controlled and the control system 100 may reside entirely on a controller on the towed vehicle. For ease of illustration, the control system 100 will be discussed herein as implemented on a vehicle controller 80; however, it is understood that the control system 100 may be implemented according to any of the afore-mentioned combinations of controllers.

The controller 80 is in communication with a tire inflation system 55. Communication lines 120 between the controller 80 and the tire inflation system 55 may carry control signals to the tire inflation system 55 or feedback signals back to the controller 80. The controller 80 may generate control signals which may, for example, enable/disable the air regulator 112 and/or enable/disable a solenoid 118 on one or more control valves 114. According to the illustrated embodiment, the air regulator 112 is configured to provide air to or remove air from the wheel 42. The air regulator 112 may include an air compressor and/or a holding tank. The illustrated control valve 114 is a two position valve that blocks air flow between the air regulator 112 and the wheel 42 in a first position and establishes a fluid communication path between the air regulator 112 and the wheel 42 in a second position. Optionally, the control valve 114 may include a second solenoid to bias the valve to a third position that allows air to vent from the wheel 42 to the atmosphere. According to still another option, a second control valve 114 may be provided, where a first control valve 114 establishes air flow from the air regulator 112 to the wheel 42 and the second control valve 114 allows air to be release from the wheel 42 to the atmosphere and/or a holding tank. It is contemplated that the tire inflation system 24, 55 may include various other hydraulic components, such as pumps, check valves, piping, tubing, and the like as required to regulate air flow in and out of each wheel 42 to which it is connected.

The controller 80 is also in communication with the wheels 42 and may further be in communication with additional sensors on the vehicle. Communication lines 130 between the controller 80 and the wheels 42 include feedback signals from sensors 48 present on the wheels 42. The deflection sensor 60, 70 provides a signal corresponding to the amount of deflection present on the wheel 42. A pressure sensor 134 in each wheel 42 provides a signal corresponding to the air pressure in the wheel 42 on which the pressure sensor 134 is mounted. Similarly, a position sensor 136 or a speed sensor 138 may be provided that provides an angular position or an angular velocity, respectively, of the wheel 42 on which it is mounted. The agricultural vehicle on which the control system 100 is implemented may also include operational sensors 160, where an operational sensor 160 is configured to generate a signal corresponding to one or more operating parameters of the agricultural vehicle. The operational sensor 160 may be, but is not limited to, a flow sensor 162 (providing an indication of the rate of flow of air or liquid used to dispense a product or of a liquid or particulate matter being dispensed), a level sensor 164 (providing an indication of the level of product remaining or harvested), or a speed sensor 166 (providing an indication of the rate of speed of the agricultural vehicle). Communication lines 168 deliver the feedback signals from the operational sensors 160 to the controller 80. Still other sensors may be provides such as a speed sensor 152 in the engine 150 of the agricultural vehicle which may communicate a speed feedback signal via communication line 151 corresponding, for example, to the revolutions per minute (RPM) of the engine or a drive shaft coupled to the engine 150. An accelerometer 156 may be mounted on the agricultural vehicle to detect vibrations in the vehicle. The accelerometer 156 may be configured to generate a signal corresponding to the acceleration in one or more axes of the vehicle. Preferably, the accelerometer 156 generates a signal corresponding to acceleration in an axis perpendicular to the surface on which the vehicle is traveling. A communication line 155 transmits the acceleration signal to the controller 80 which may store successive readings of the signal to detect a pattern or cyclical acceleration signal that may indicate the vehicle is operating at a resonant operating point.

In operation, the control system 100 controls the wheel dynamics of an agricultural vehicle during operation of that vehicle. With reference again to FIGS. 2 and 8, a self-propelled sprayer 40 is prepared for operation by filling the fluid holding tank 44 with a desired product to be applied to a field, such as a liquid fertilizer. The air pressure in the wheels 42 may be set to a level which provides a desired ride quality based, for example, on the sprayer 40 operating characteristics, such as the weight of the load and tuning of the suspension, or on application operating characteristics, such as the type of crop to which the fertilizer is being applied. The sprayer 40 is driven from the preparation area to a field to apply the product to the field over a paved surface, gravel surface, dirt surface, or a combination thereof. During operation, the sprayer 40 extends the wing booms 50 and drives through the field applying the fertilizer to the field. As the fertilizer is dispensed, the level 46 of fluid in the holding tank 44 decreases, reducing the weight of the load on the sprayer 40. As a result of the varying load, the air pressure in the wheels 42 may be at an incorrect value to achieve the desired ride quality. The controller 80 receives one or more feedback signals from the operational sensors 160 corresponding, for example, to the flow rate of the fertilizer as it is applied or to a level 46 of the fertilizer remaining in the holding tank 44. The processor 90 determines a weight of the remaining load and generates a command signal to the tire inflation system 55 to adjust the air pressure in the wheels 42 of the sprayer. The controller 80 may store a lookup table in memory 92 which defines a set of desired air pressures corresponding to the loading of the sprayer 40 or, optionally, the controller 80 may execute a series of instructions to determine a desired air pressure as a function of the measured operational parameter. The controller 80 also receives a feedback signal from each wheel 42 corresponding to the air pressure in the wheel 42. When the air pressure in the wheel 42 reaches the desired level, the controller 80 generates a new command signal or removes the original command signal to the tire inflation system 55 such that the tire inflation system 55 maintains the desired air pressure in each wheel 42.

According to another aspect of the invention, during preparation of the sprayer 40, a desired amount of tire deflection may be determined based, for example, on the sprayer 40 operating characteristics, such as the weight of the load and tuning of the suspension, or on application operating characteristics, such as the type of crop to which the fertilizer is being applied. In certain crops, tire compaction may be a primary concern during application of a fertilizer. Thus, it may be desirable to have a greater amount of tire deflection to spread the weight of the sprayer 40 over a greater surface area. For other crops, wheel traffic may be of greater concern than tire compaction, and, therefore, it may be desirable to have a lesser amount of tire deflection to reduce the surface area contacted by the tire 49. A desired amount of tire deflection may be entered into the controller 80 via the user interface 94, and the controller 80 generates a command signal to the tire inflation system 55 to either deliver air to or remove air from the wheels 42 to achieve the desired amount of tire deflection A tire deflection sensor 60, 70 provides a feedback signal to the controller 80, and when the tire deflection of each tire 49 reaches the desired amount, the controller 80 generates a new command signal or removes the original command signal to the tire inflation system 55 such that the tire inflation system 55 maintains the desired amount of tire deflection in each wheel 42.

If the tire deflection sensor 60, 70 is mounted to a rotating portion of the wheel 42, such as the rim 47, the measured tire deflection will change as a function of the angular position of the wheel. The controller 80 may be configured to periodically read the amount of deflection indicated by the signal from the deflection sensor 60, 70 and store a series of values in the memory device 92. Preferably, a position sensor 136 generates a signal corresponding to an angular position of the wheel 42. The controller 80 reads the angular position of the wheel along with the deflection of the tire 49 to identify the position at which the deflection sensor 60, 70 is measuring perpendicular to the surface on which the sprayer 40 is traveling. The controller 80 stores at least two deflection measurements corresponding to the first radius. R1, at which no, or minimal, tire deflection occurs and to the second radius, R2, at which the maximum tire deflection occurs. The controller 80 subtracts the second radius, R2, from the first radius, R1, to obtain a value of the deflection of the tire 49. The controller 80, therefore, may determine tire deflection once per revolution of the wheel 42.

Optionally, the controller 80 may be configured to determine tire deflection using just the deflection sensor 60, 70. The controller 80 may read the signal generated from the deflection sensor 60, 70 at a periodic interval. Based, for example, on the speed at which the sprayer is moving and of a known diameter of the wheel 42, the controller 80 stores values for one revolution of the wheel 42. The maximum deflection within the revolution may be used as the deflection of the tire 49. Optionally, the controller 80 may detect a change in the tire deflection. The controller 80 may record a first point at which the signal from the deflection sensor 60, 70 changes and an end point at which the signal from the deflection sensor 60, 70 stops changing. The region over which the signal is changing is the surface area of the tire 49 contacting the ground. It is contemplated that still other methods of measuring tire deflection may be utilized without deviating from the scope of the invention.

The controller 80 may also receive a feedback signal corresponding to the speed at which the sprayer 40 is travelling. The speed signal may be generated by an engine speed sensor 152 or other speed sensor 138, 166 mounted on the sprayer 40. If the sprayer 40 is traveling at a slow speed, the wheel 42, in turn, rotates at a slow speed. If the controller 80 generates a control signal to the tire inflation system 55 as a function of the deflection of the tire 49, the wheel 42 may become either over or under inflated within one revolution of the wheel 42. Thus, the controller 80 may also monitor the air pressure signal from the pressure sensor 134. A look, up table may be stored in the memory device 92 which defines an expected amount tire deflection resulting at different air pressures within the wheel 42. The controller 80 may then generate a command to the tire inflation system 55 to maintain a desired tire deflection as a function of the tire deflection, the tire pressure, or a combination thereof.

According to still another aspect of the invention, the controller 80 may utilize the tire inflation system 55 to avoid resonant bouncing of the sprayer 40. Under certain operating conditions, for example, traveling at certain speeds on a paved road or over evenly spaced furrows in a field, the sprayer 40 may encounter "wheel hop" or operation at a resonant operating point. During wheel hop, the sprayer 40 is in a resonant operating condition in which the sprayer 40 begins pitching back and forth with little or minimal dampening from the suspension. To detect wheel hop, the controller 80 may monitor an acceleration signal from the accelerometer 156. If the acceleration signal exhibits an acceleration first in one direction and then in the opposite direction where the magnitude of acceleration stays above a predefined amount for multiple cycles, for example, three cycles, the controller 80 determines that the sprayer 40 is operating at one of the resonant operating points. Typically, wheel hop occurs at a low frequency for example in the range of 1-3 cycles per second. The controller 80 may generate a command signal to the tire inflation system 55 to provide short bursts of air to the tires 49 or to remove air from the tires 49 in short bursts. Further, the controller 80 may alternately provide air to and remove air from the tires 49 at a frequency coincident with the frequency of oscillation present in the acceleration signal to dampen the wheel hop.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for controlling performance of a plurality of wheels on an agricultural vehicle, wherein each wheel includes a rim and a tire mounted to the rim, the system comprising:
    a deflection sensor generating a feedback signal corresponding to a deflection of the tire on at least one of the plurality of wheels, the deflection sensor including:
        an arm positioned within the tire and having a terminal end in continual engagement with an inner surface of the tire, the arm having a position that varies in response to deflection of the tire; and
        a sensor operatively connected to the arm for generating the feedback signal in response to the position of the arm;
    at least one air regulator configured to deliver air to and remove air from the plurality of wheels responsive to a control signal; and
    a controller configured to receive the feedback signal from the deflection sensor and to generate the control signal for the air regulator as a function of the deflection detected by the deflection sensor.

2. The system of claim 1 further comprising a plurality of deflection sensors, wherein each deflection sensor is operatively mounted to one of the plurality of wheels on the agricultural vehicle and wherein the air regulator is further configured to deliver air to and remove air from each of the plurality of wheels as a function of the feedback signal generated by the deflection sensor operatively mounted to that wheel.

3. The system of claim 1 further comprising a position sensor generating a position feedback signal corresponding to an angular position of the wheel, wherein the controller reads the feedback signal from the deflection sensor at one or more predefined angular positions.

4. The system of claim 1 further comprising an accelerometer mounted to the agricultural vehicle, wherein the accelerometer is configured to generate an acceleration feedback signal in an axis generally perpendicular to a surface on which the agricultural vehicle is traveling.

5. The system of claim 4 wherein the controller generates the control signal for the air regulator responsive to the acceleration feedback signal.

6. A system for controlling performance of a plurality of wheels on an agricultural vehicle configured to carry a load which varies during operation of the agricultural vehicle, wherein each wheel includes a rim and a tire mounted to the rim, the system comprising:
    at least one pressure sensor generating a first feedback signal corresponding to a tire pressure in a tire of one of the plurality of wheels;
    a deflection sensor generating a second feedback signal corresponding to a deflection of the tire of the one of the plurality of wheels, the deflection sensor including:
        an arm positioned within the tire and having a terminal end in continual engagement with an inner surface of the tire, the arm having a position that varies in response to deflection of the tire; and
        a sensor operatively connected to the arm for generating the second feedback signal in response to the position of the arm;
    at least one air regulator configured to control air delivered to and removed from the plurality of wheels responsive to a control signal; and
    a controller configured to receive the first feedback signal and the second feedback signal and to generate the control signal for the air regulator as a function of the first and second feedback signals.

7. The system of claim 6 further comprising a plurality of deflection sensors, wherein each deflection sensor is operatively mounted to one of the plurality of wheels on the agricultural vehicle and wherein the air regulator is further configured to deliver air to and remove air from each of the plurality of wheels as a function of the feedback signal generated by the deflection sensor operatively mounted to that wheel.

8. The system of claim 6 further comprising a position sensor generating a position feedback signal corresponding to an angular position of the wheel, wherein the controller reads the feedback signal from the deflection sensor at one or more predefined angular positions.

9. The system of claim 6 further comprising an accelerometer mounted to the agricultural vehicle, wherein the accelerometer is configured to generate an acceleration feedback signal in an axis generally perpendicular to a surface on which the agricultural vehicle is traveling and wherein the controller generates the control signal for the air regulator responsive to the acceleration feedback signal.

10. In an agricultural vehicle having a plurality of inflatable wheels, wherein each inflatable wheel includes a rim and a tire mounted to the rim, a system for controlling a dynamic performance of the plurality of inflatable wheels, comprising:
    a pressure sensor generating a first feedback signal corresponding to a tire pressure in a tire on one of the plurality of wheels;
    a deflection sensor generating a second feedback signal corresponding to a deflection of the tire on the one of the plurality of inflatable wheels, the deflection sensor including:
        an arm positioned within the tire and having a terminal end in continual engagement with an inner surface of the tire, the arm having a position that varies in response to deflection of the tire; and
        a sensor operatively connected to the arm for generating the second feedback signal in response to the position of the arm;

at least one air regulator configured to control air delivered to and removed from the plurality of wheels responsive to a control signal; and a controller configured to receive the first and second feedback signals and to generate the control signal for the air regulator as a function of the first and second feedback signals.

11. The system of claim 10 further comprising a plurality of deflection sensors, wherein each deflection sensor is operatively mounted to one of the plurality of wheels on the agricultural vehicle and wherein the air regulator is further configured to deliver air to and remove air from each of the plurality of wheels as a function of the feedback signal generated by the deflection sensor operatively mounted to that wheel.

12. The system of claim 10 further comprising a position sensor generating a position feedback signal corresponding to an angular position of the wheel, wherein the controller reads the second feedback signal from the deflection sensor at one or more predefined angular positions.

13. The system of claim 10 further comprising an accelerometer mounted to the agricultural vehicle, wherein the accelerometer is configured to generate an acceleration feedback signal in an axis generally perpendicular to a surface on which the agricultural vehicle is traveling and wherein the controller generates the control signal for the air regulator responsive to the acceleration feedback signal.

\* \* \* \* \*